(12) United States Patent
Takaoka

(10) Patent No.: US 10,309,454 B2
(45) Date of Patent: Jun. 4, 2019

(54) SQUEEZE FILM DAMPER BEARING DEVICE

(71) Applicant: HONDA MOTOR CO., LTD., Tokyo (JP)

(72) Inventor: Keisuke Takaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/898,914

(22) Filed: Feb. 19, 2018

(65) Prior Publication Data

US 2018/0245628 A1   Aug. 30, 2018

(30) Foreign Application Priority Data

Feb. 24, 2017   (JP) .................................. 217-033472

(51) Int. Cl.

| F16C 27/04 | (2006.01) |
| F16C 37/00 | (2006.01) |
| F16C 19/06 | (2006.01) |
| F01D 25/16 | (2006.01) |
| F16C 19/55 | (2006.01) |
| F16F 15/02 | (2006.01) |

(Continued)

(52) U.S. Cl.
CPC .......... *F16C 27/045* (2013.01); *F01D 25/164* (2013.01); *F16C 19/06* (2013.01); *F16C 19/55* (2013.01); *F16C 35/063* (2013.01); *F16C 41/00* (2013.01); *F16F 15/0237* (2013.01); *F01D 25/183* (2013.01); *F05D 2240/55* (2013.01); *F16C 37/002* (2013.01); *F16C 2226/60* (2013.01); *F16C 2233/00* (2013.01); *F16C 2360/23* (2013.01)

(58) Field of Classification Search
CPC ........ F16C 19/06; F16C 19/27; F16C 27/045; F16C 37/002; F16C 41/00; F16C 2360/23; F16C 35/063; F16C 19/55; F16C 2226/60; F16C 2233/00; F16F 15/0237; F05D 2240/55; F01D 25/164; F01D 25/183
USPC ............................. 384/94, 99, 448, 536, 581
See application file for complete search history.

(56) References Cited

U.S. PATENT DOCUMENTS

| 1,557,542 A | * | 10/1925 | Akins ..................... B41F 19/06 |
| | | | 101/3.1 |
| 2,302,864 A | * | 11/1942 | Huber ................... F04B 1/0426 |
| | | | 403/234 |

(Continued)

FOREIGN PATENT DOCUMENTS

| GB | 983956 A | * | 2/1965 | ............ F16C 35/077 |
| JP | 52064550 A | * | 5/1977 | ............ F16C 27/045 |

(Continued)

*Primary Examiner* — Marcus Charles
(74) *Attorney, Agent, or Firm* — Rankin, Hill & Clark LLP

(57) ABSTRACT

A squeeze film damper bearing device includes an inner race that is fitted around an outer periphery of a rotating shaft, an outer race that is supported via an annular space on an inner periphery of a bearing sleeve provided on a bearing retaining member, the annular space forming a squeeze film, and a plurality of rolling bodies that are disposed between the inner race and the outer race. The bearing sleeve is formed from a plurality of sleeve elements that are divided in a peripheral direction, and the plurality of sleeve elements move in a radial direction so as to be capable of changing a height in the radial direction of the annular space.

4 Claims, 4 Drawing Sheets

(51) Int. Cl.
*F16C 41/00* (2006.01)
*F16F 15/023* (2006.01)
*F16C 35/063* (2006.01)
*F01D 25/18* (2006.01)

(56) References Cited

U.S. PATENT DOCUMENTS

| | | | | |
|---|---|---|---|---|
| 2,506,404 | A * | 5/1950 | Morton | F16C 23/04 384/535 |
| 4,084,861 | A * | 4/1978 | Greenberg | F01D 25/164 384/105 |
| 4,952,076 | A * | 8/1990 | Wiley, III | F01D 25/164 384/535 |
| 4,981,415 | A * | 1/1991 | Marmol | F01D 25/164 384/215 |
| 5,044,781 | A * | 9/1991 | Werner | F16C 27/04 384/99 |
| 5,807,070 | A * | 9/1998 | Bock | F04D 29/051 29/407.01 |
| 6,325,546 | B1 * | 12/2001 | Storace | F01D 21/04 384/536 |
| 7,431,504 | B1 * | 10/2008 | Pelfrey | F01D 25/164 384/535 |
| 8,272,786 | B2 * | 9/2012 | Cottrell | B64D 27/26 188/298 |
| 9,494,048 | B1 * | 11/2016 | Parnin | F16F 15/0237 |
| 9,702,404 | B2 * | 7/2017 | Smedresman | F16C 23/08 |
| 2006/0083449 | A1 * | 4/2006 | Laurant | F16C 27/045 384/99 |
| 2010/0207007 | A1 * | 8/2010 | Cottrell | B64D 27/26 248/638 |
| 2010/0226602 | A1 * | 9/2010 | Laredius | D21D 1/30 384/448 |
| 2014/0169715 | A1 * | 6/2014 | Hebrard | F16C 41/00 384/448 |
| 2016/0160924 | A1 * | 6/2016 | Meyers | F01D 25/164 384/474 |

FOREIGN PATENT DOCUMENTS

| | | | | |
|---|---|---|---|---|
| JP | | 53120057 A | * 10/1978 | ............ F16F 15/023 |
| JP | | 06017826 A | * 1/1994 | |
| JP | | 2003-083325 | 3/2003 | |

* cited by examiner

SQUEEZE FILM DAMPER BEARING DEVICE

CROSS REFERENCE TO RELATED APPLICATIONS

The present application claims priority under 35 U.S.C. § 119 to Japanese Patent Application No. 2017-33472 filed Feb. 24, 2017 the entire contents of which are hereby incorporated by reference.

BACKGROUND OF THE INVENTION

Field of the Invention

The present invention relates to a squeeze film damper bearing device having an inner race that is fitted around an outer periphery of a rotating shaft, an outer race that is supported via an annular space on an inner periphery of a bearing sleeve provided on a bearing retaining member, the annular space forming a squeeze film, and a plurality of rolling bodies that are disposed between the inner race and the outer race.

Description of the Related Art

A squeeze film damper bearing device having such a structure is known from, for example, Japanese Patent Application Laid-open No. 2003-83325.

With regard to the above conventional squeeze film damper bearing device, since the height in the radial direction of an annular space (hydraulic oil space 13) formed between the outer periphery of an outer race of a bearing and the inner periphery of a bearing sleeve (support ring 11), that is, the film thickness of a squeeze film, is constant and the attenuation coefficient is invariable, even if a sufficient attenuation effect can be obtained in, for example, a low rotational speed region of a rotating shaft, a sufficient attenuation effect cannot be obtained in a high rotational speed region of the rotating shaft, and there is a possibility that vibration of the rotating shaft will increase.

SUMMARY OF THE INVENTION

The present invention has been accomplished in light of the above circumstances, and it is an object thereof to provide a squeeze film damper bearing device that can exhibit a damping effect over a wide rotational speed region of a rotating shaft.

In order to achieve the object, according to a first aspect of the present invention, there is provided a squeeze film damper bearing device having an inner race that is fitted around an outer periphery of a rotating shaft, an outer race that is supported via an annular space on an inner periphery of a bearing sleeve provided on a bearing retaining member, the annular space forming a squeeze film, and a plurality of rolling bodies that are disposed between the inner race and the outer race, wherein the bearing sleeve is formed from a plurality of sleeve elements that are divided in a peripheral direction, and the plurality of sleeve elements move in a radial direction so as to be capable of changing a height in the radial direction of the annular space.

In accordance with the first aspect, since the squeeze film damper bearing device includes the inner race fitted around the outer periphery of the rotating shaft, the outer race supported on the inner periphery of the bearing sleeve provided on the bearing retaining member, via the annular space forming a squeeze film, and the plurality of rolling bodies disposed between the inner race and the outer race, when the outer race is displaced with respect to the inner periphery of the bearing sleeve in response to vibration of the rotating shaft, the squeeze film formed in the annular space sandwiched between the inner periphery of the bearing sleeve and the outer periphery of the outer race resists movement of the outer race, thus damping the vibration of the rotating shaft.

Since the bearing sleeve is formed from the plurality of sleeve elements, which are divided in the peripheral direction, and the plurality of sleeve elements move in the radial direction so as to be capable of changing the height in the radial direction of the annular space, it is possible to change the height in the radial direction of the annular space to thus alter the attenuation characteristics of the squeeze film, thereby enabling a damping effect to be exhibited over a wide rotational speed region of the rotating shaft.

According to a second aspect of the present invention, a guide pin that projects radially outward from an outer periphery of the sleeve element is slidably fitted into a guide hole extending through the bearing retaining member in the radial direction, a pair of return springs extending in the radial direction are disposed between opposite end parts in the peripheral direction of the sleeve element and a spring seat projecting radially outward from an inner periphery of the bearing retaining member, and a drive mechanism that makes the sleeve element move in the radial direction is connected to an outer end in the radial direction of the guide pin.

In accordance with the second aspect, since the guide pin projecting radially outward from the outer periphery of the sleeve element is slidably fitted into the guide hole extending through the bearing retaining member in the radial direction, the pair of return springs extending in the radial direction are disposed between the opposite end parts in the peripheral direction of the sleeve element and the spring seat projecting radially outward from the inner periphery of the bearing retaining member, and the drive mechanism, which makes the sleeve element move in the radial direction, is connected to the outer end in the radial direction of the guide pin, it is possible to reliably move the sleeve elements in the radial direction in parallel with each other, thereby changing the height in the radial direction of the annular space evenly in the peripheral direction.

According to a third aspect of the present invention, in addition to the first or second aspect, there is provided the squeeze film damper bearing device, further comprising a vibration sensor that detects vibration of the rotating shaft, and a controller that controls operation of the drive mechanism according to vibration of the rotating shaft detected by the vibration sensor.

In accordance with the third aspect, since the device includes the vibration sensor, which detects vibration of the rotating shaft, and the controller, which controls operation of the drive mechanism according to vibration of the rotating shaft detected by the vibration sensor, it is possible to automatically change the attenuation characteristics of the squeeze film according to vibration of the rotating shaft, thereby enabling the vibration of the rotating shaft to be damped effectively.

Note that a low pressure system shaft 15 and a sleeve 41 of an embodiment correspond to the rotating shaft of the present invention, balls 47 of the embodiment correspond to the rolling bodies of the present invention, and an electronic control unit U of the embodiment corresponds to the controller of the present invention.

BRIEF DESCRIPTION OF THE DRAWINGS

The above and other objects, characteristics and advantages of the present invention will be clear from detailed descriptions of the preferred embodiment, which will be provided below with reference to the attached drawings.

DESCRIPTION OF THE PREFERRED EMBODIMENT

An embodiment of the present invention is explained below with reference to FIG. 1 to FIG. 4.

Figure 1:
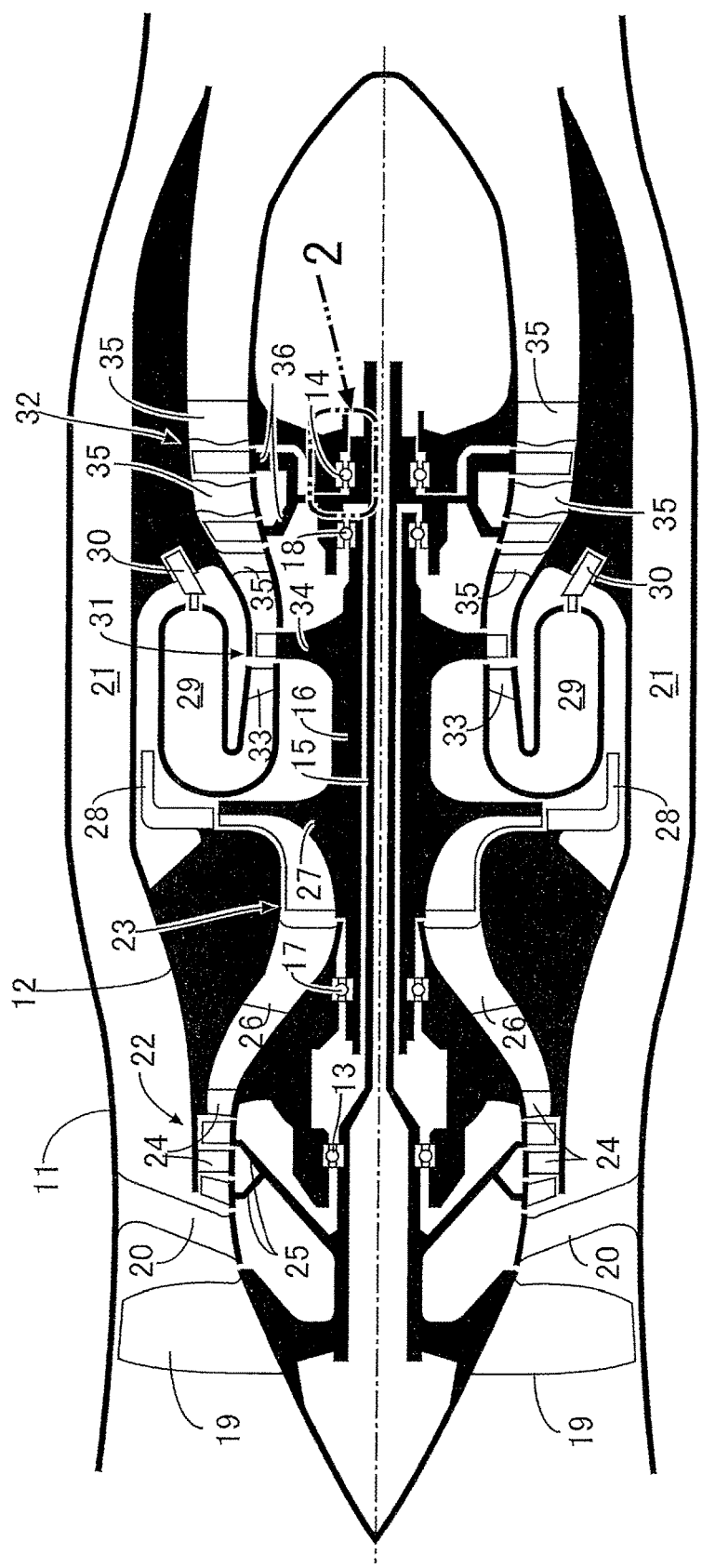
FIG. 1 is a diagram showing the overall structure of a gas turbine engine.

As shown in FIG. 1, a gas turbine engine for an aircraft to which the present invention is applied includes an outer casing 11 and an inner casing 12, and a front part and a rear part of a low pressure system shaft 15 are rotatably supported in the interior of the inner casing 12 via a front first bearing 13 and a rear first bearing 14 respectively. A tubular high pressure system shaft 16 is relatively rotatably fitted around the outer periphery of an intermediate part in the axial direction of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

A front fan 19 is fixed to the front end of the low pressure system shaft 15, blade ends of the front fan 19 facing an inner face of the outer casing 11. Part of the air drawn or sucked in by the front fan 19 passes through stator vanes 20 disposed between the outer casing 11 and the inner casing 12, part thereof then passes through an annular bypass duct 21 formed between the outer casing 11 and the inner casing 12 and is jetted rearward, and another part thereof is supplied to an axial type low pressure compressor 22 and a centrifugal type high pressure compressor 23 disposed in the interior of the inner casing 12.

The low pressure compressor 22 includes stator vanes 24 fixed to the interior of the inner casing 12 and a low pressure compressor wheel 25 equipped with compressor blades on the outer periphery and fixed to the low pressure system shaft 15. The high pressure compressor 23 includes stator vanes 26 fixed to the interior of the inner casing 12 and a high pressure compressor wheel 27 equipped with compressor blades on the outer periphery and fixed to the high pressure system shaft 16.

A reverse flow combustion chamber 29 is disposed to the rear of a diffuser 28 connected to the outer periphery of the high pressure compressor wheel 27, and fuel is injected into the interior of the reverse flow combustion chamber 29 from a fuel injection nozzle 30. Fuel and air are mixed in the interior of the reverse flow combustion chamber 29 and undergo combustion, and the combustion gas thus generated is supplied to a high pressure turbine 31 and a low pressure turbine 32.

The high pressure turbine 31 includes nozzle guide vanes 33 fixed to the interior of the inner casing 12 and a high pressure turbine wheel 34 equipped with turbine blades on the outer periphery and fixed to the high pressure system shaft 16. The low pressure turbine 32 includes nozzle guide vanes 35 fixed to the interior of the inner casing 12 and a low pressure turbine wheel 36 equipped with turbine blades on the outer periphery and fixed to the low pressure system shaft 15.

Therefore, when the high pressure system shaft 16 is driven with a starter motor (not shown) air that has been drawn or sucked in by the high pressure compressor wheel 27 is supplied to the reverse flow combustion chamber 29, mixed with fuel and undergoes combustion, and the combustion gas thus generated drives the high pressure turbine wheel 34 and the low pressure turbine wheel 36. As a result, the low pressure system shaft 15 and the high pressure system shaft 16 rotate, and the front fan 19, the low pressure compressor wheel 25, and the high pressure compressor wheel 27 compress air and supply it to the reverse flow combustion chamber 29, thus enabling the gas turbine engine to continue to run even when the starter motor is stopped.

While the gas turbine engine is running, part of the air drawn or sucked in by the front fan 19 passes through the bypass duct 21 and is jetted rearward thus generating the main thrust, particularly when flying at low speed. The remaining part of the air drawn or sucked in by the front fan 19 is supplied to the reverse flow combustion chamber 29, mixed with fuel, and undergoes combustion, and it drives the low pressure system shaft 15 and the high pressure system shaft 16 and is then jetted rearward, thus generating thrust.

Figure 2:
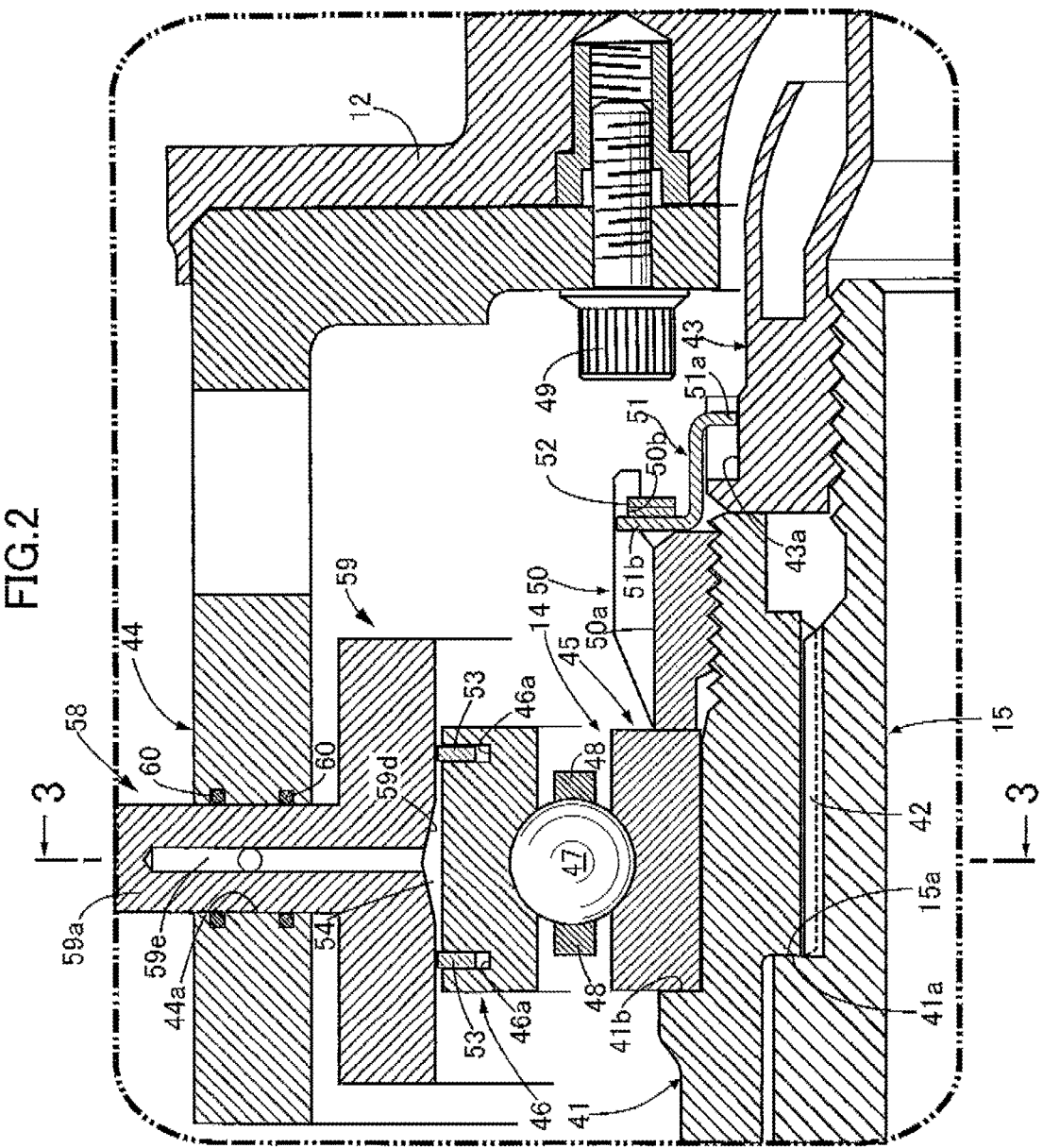
FIG. 2 is an enlarged view of part 2 in FIG. 1.
Figure 3:
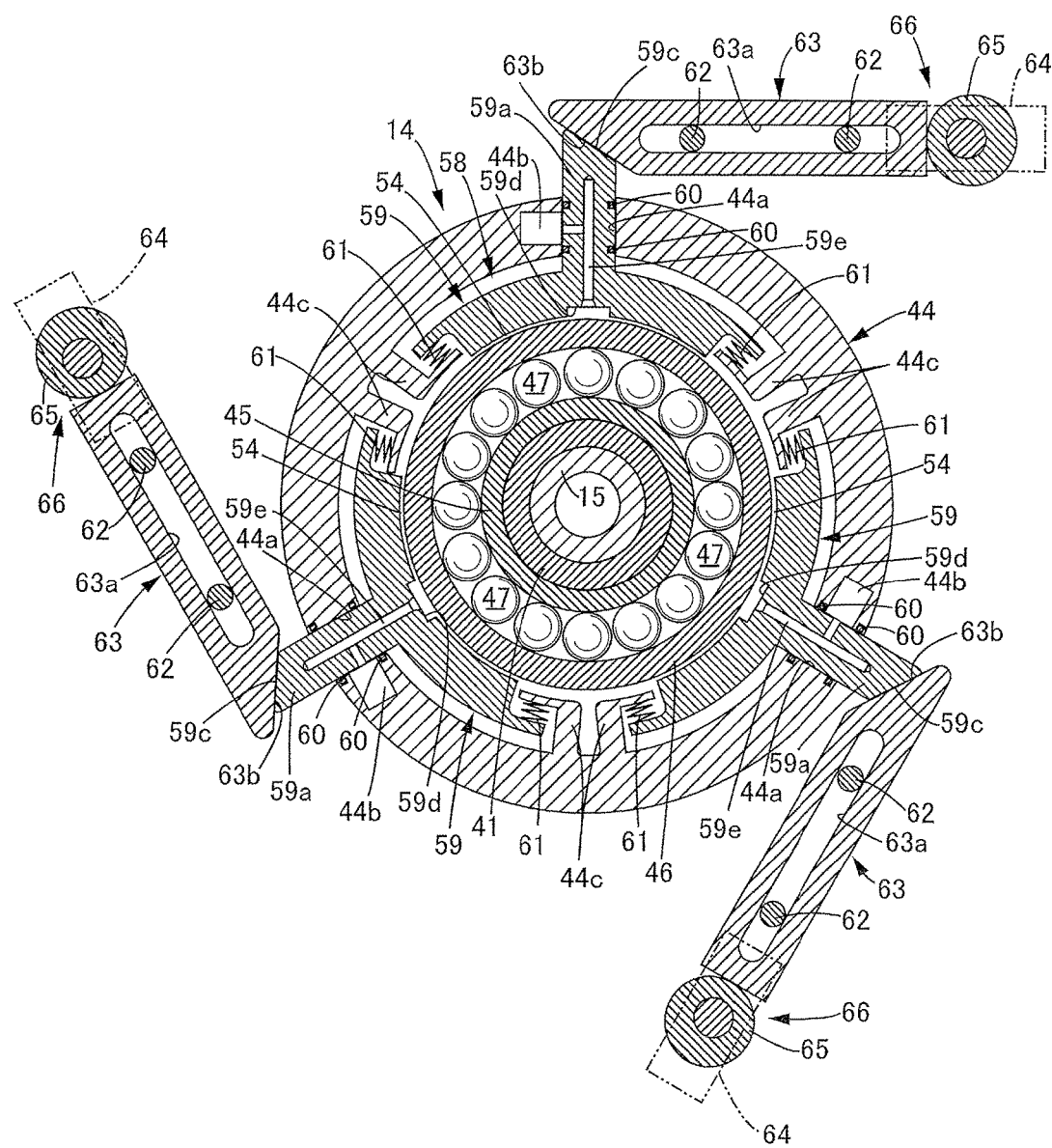
FIG. 3 is a sectional view along line 3-3 in FIG. 2.
Figure 4:
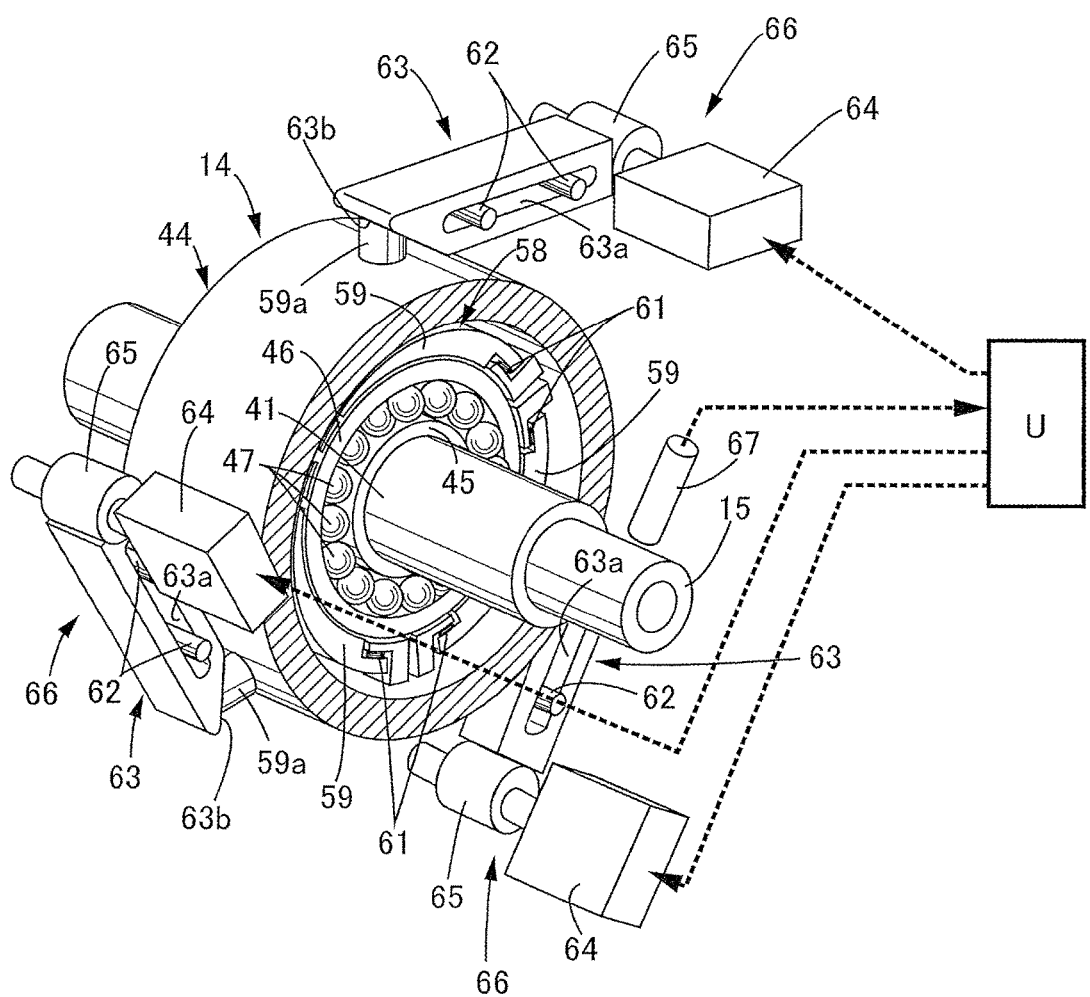
FIG. 4 is a perspective view of a rear first bearing.

The structure around the rear first bearing 14 is now explained by reference to FIG. 2 to FIG. 4.

A sleeve 41 for supporting the low pressure turbine wheel 36 is fitted around the outer periphery of the low pressure system shaft 15 by a spline fitting 42. The sleeve 41 is fastened to the low pressure system shaft 15 by screwing a first nut member 43 around the outer periphery of a shaft end of the low pressure system shaft 15 so as to push the sleeve 41 leftward in FIG. 2, thereby pressing a step portion 41a formed on the inner periphery of the sleeve 41 against a step portion 15a formed on the outer periphery of the low pressure system shaft 15.

The rear first bearing 14 includes an inner race 45 fitted around the outer periphery of the sleeve 41, an outer race 46 supported via a bearing sleeve 58 on the inner periphery of a bearing retaining member 44 provided on the inner casing 12, a plurality of balls 47 disposed between the inner race 45 and the outer race 46, and a retainer 48 retaining the balls 47 at equal intervals in the peripheral direction. The bearing retaining member 44 is fastened to the inner casing 12 by bolts 49, and the inner race 45 is fastened by being urged leftward in FIG. 2 by a second nut member 50 screwed around the outer periphery of an end part of the sleeve 41, thereby being pressed against a step portion 41b formed on the outer periphery of the sleeve 41.

The direction in which the first nut member 43 is screwed and the direction in which the second nut member 50 is screwed are set so as to be opposite to each other. That is, when the first nut member 43 is a right-hand screw, the second nut member 50 is a left-hand screw, and when the first nut member 43 is a left-hand screw, the second nut member 50 is a right-hand screw. A plurality of first groove portions 43a opening rightward in the axial direction in FIG. 2 are formed in the outer periphery of an end part of the first nut member 43 at equal intervals in the peripheral direction, and a plurality of second groove portions 50a opening rightward in the axial direction in FIG. 2 are formed in the outer periphery of the second nut member 50 at equal intervals in the peripheral direction.

An annular linking member 51 disposed between the first nut member 43 and the second nut member 50 includes two first projecting portions 51a that are disposed at intervals of 180° in the circumferential direction and can engage with the first groove portions 43a of the first nut member 43, and three second projecting portions 51b that are disposed at intervals of 120° in the circumferential direction and can engage with the second groove portions 50a of the second nut member 50.

A ring spring 52 that makes the linking member 51 latch with the second nut member 50 is one that is formed by winding a flat elastic metal plate with substantially two rotations into a ring shape, and an outer peripheral part thereof can engage with step portions 50b formed on the inner periphery of an end part of the second nut member 50.

Since the directions in which the first nut member 43 and the second nut member 50 are screwed are opposite to each other, if the first nut member 43 attempts to rotate in a direction in which it is loosened, the rotation acts on the second nut member 50 via the linking member 51 so as to tighten it, and it is thus possible to prevent both the first nut member 43 and the second nut member 50 from becoming loosened. Conversely, if the second nut member 50 attempts to rotate in a direction in which it is loosened, since the rotation acts on the first nut member 43 via the linking member 51 so as to tighten it, it is possible to simultaneously prevent both the first nut member 43 and the second nut member 50 from becoming loosened.

The rear first bearing 14 supporting the rear part of the low pressure system shaft 15 forms a squeeze film damper bearing, and seal rings 53 are fitted into a pair of seal ring grooves 46a formed in the outer periphery of the outer race 46 thereof. The bearing sleeve 58 disposed in the interior of the annular bearing retaining member 44 is divided into three sleeve elements 59 having a central angle of substantially 120°, and a columnar guide pin 59a projecting radially outward from a middle part of the outer periphery of each sleeve element 59 is slidably supported via O-rings 60 by a guide hole 44a formed in the bearing retaining member 44.

A pair of spring seats 44c having an L-shaped section project radially inward from two positions of the inner periphery of the bearing retaining member 44 corresponding to opposite end parts in the peripheral direction of each sleeve element 59, and a pair of return springs 61 are disposed in the radial direction in a compressed state between the sleeve member 59 and the pair of spring seats 44c. The sleeve element 59 is urged radially outward by the resilient force of the pair of return springs 61.

The seal rings 53 expand radially outward due to self resilience and resiliently abut against the inner periphery of the sleeve elements 59, thus defining an annular space 54 having a predetermined gap in the radial direction between the outer periphery of the outer race 46 and the inner periphery of the sleeve elements 59.

Therefore, the sleeve elements 59 can undergo relative movement within a range of the above gap in the radial direction relative to the outer race 46, and during this process the seal rings 53 undergo elastic deformation within the seal ring grooves 46a of the outer race 46, thus maintaining a state of abutment against the inner periphery of the sleeve elements 59.

A guide groove 63a formed in a slide arm 63 is slidably support on a pair of slide guides 62 provided on the bearing retaining member 44, and a cam 65 that is rotated by a stepping motor 64 abuts against an end part of the slide arm 63. The slide arm 63 and the guide pin 59a intersect each other at an angle of 90°, and a cam face 63b provided on the end part of the slide arm 63 abuts against a cam face 59c provided on an end part of the guide pin 59a. The stepping motor 64, the cam 65, and the slide arm 63 form a drive mechanism 66 that drives the sleeve element 59 in the radial direction.

An adjustment groove 59d facing the annular space 54 is formed in a middle part of the inner periphery of the sleeve element 59, and an oil pump (not illustrated) is connected to the adjustment groove 59d via an oil passage 44b of the bearing retaining member 44 and an oil passage 59e of the sleeve element 59.

Connected to an electronic control unit U that controls operation of the drive mechanisms 66 in order to suppress vibration of the low pressure system shaft 15 are a vibration sensor 67 for detecting vibration of the low pressure system shaft 15 and three stepping motors 64. The amount of drive of the stepping motors 64 is determined by feedback control between the amount of drive (input) of the stepping motors 64 and the output from the vibration sensor 67.

The operation of the embodiment of the present invention having the above arrangement is now explained.

When oil is supplied from the oil pump, to the annular space 54 via the oil passages 44b of the bearing retaining member 44 and the oil passages 59e and the adjustment grooves 59d of the sleeve elements 59, a squeeze film formed from a thin film of oil is formed in the annular space 54. When the low pressure system shaft 15 vibrates in the radial direction while the gas turbine engine is running, the vibration is transmitted to the outer race 46 of the rear first bearing 14 having the inner race 45 supported by the sleeve 41 integrally fixed to the low pressure system shaft 15.

In this process, since the outer race 46 of the rear first bearing 14 is floatingly supported on the inner periphery of the sleeve elements 59 via the squeeze film, the size of the gap in the radial direction of the annular space 54 increases and decreases according to the vibration in the radial direction of the outer race 46, the outer race 46 is damped by a resistance force generated by flow and compression of viscous oil of the squeeze film within the annular space 54, and this enables the vibration of the low pressure system shaft 15 to be suppressed.

When the squeeze film exhibits a damping effect, oil that has absorbed vibrational energy generates heat and its temperature increases, but oil whose temperature has increased is discharged successively via abutment clearances of the seal rings 53 and fresh oil is supplied from the oil pump, thus maintaining the damping function of the squeeze film.

The vibration of the low pressure system shaft 15 changes in accordance with the rotational speed, and the film thickness of the squeeze film that is appropriate for damping the vibration is determined by feedback control between the amount of drive (input) of the stepping motors 64 and the amount of vibration (output) detected by the vibration sensor 67. This changes the height in the radial direction of the annular space 54, thus adjusting the film thickness of the squeeze film.

That is, when the stepping motors 64 are driven in one direction, the slide arms 63, which are pushed by the cams 65, are guided by the slide guides 62 and move therealong, the cam faces 63b thereof push the cam faces 59c of the guide pins 59a, the three sleeve elements 59 move radially inward while compressing the return springs 61, and the film thickness of the squeeze film formed between the inner periphery of the sleeve elements 59 and the outer periphery of the outer race 46 is reduced evenly in the peripheral direction. On the other hand, when the stepping motors 64 are driven in the other direction, the three sleeve elements 59 are moved radially outward by the resilient force of the return springs 61, and the film thickness of the squeeze film is increased evenly in the peripheral direction.

As hereinbefore described, in accordance with the present embodiment, since the plurality of sleeve elements 59 move in the radial direction in response to vibration of the low pressure system shaft 15 to thus automatically change the height in the radial direction of the annular space 54, it becomes possible to maintain optimum attenuation characteristics of the squeeze film, and a damping effect can be exhibited effectively over a wide rotational speed region of the low pressure system shaft 15.

An embodiment of the present invention is explained above, but the present invention may be modified in a variety of ways as long as the modifications do not depart from the gist of the present invention.

For example, the subject to which the present invention is applied is not limited to the rear first bearing 14 of the gas turbine engine of the embodiment, and it may be applied to another bearing of a gas turbine engine, and it is also possible to apply it to a bearing of any application other than a gas turbine engine.

Furthermore, the rear first bearing 14 of the embodiment is a ball bearing, but it may be another type of bearing such as a roller bearing or a needle bearing.

Moreover, in the embodiment the bearing sleeve 58 is divided into three sleeve elements 59, but it may be divided into any number.

What is claimed is:

1. A squeeze film damper bearing device comprising an inner race that is fitted around an outer periphery of a rotating shaft, an outer race that is supported via an annular space on an inner periphery of a bearing sleeve provided on a bearing retaining member, the annular space forming a squeeze film, and a plurality of rolling bodies that are disposed between the inner race and the outer race,
wherein the bearing sleeve is formed from a plurality of sleeve elements that are spaced in a peripheral direction, and the plurality of sleeve elements move in a radial direction so as to be capable of changing a height in the radial direction of the annular space.

2. The squeeze film damper bearing device according to claim 1, wherein a guide pin that projects radially outward from an outer periphery of each of the plurality of sleeve elements is slidably fitted into a respective guide hole extending through the bearing retaining member in the radial direction, a pair of return springs extending in the radial direction are disposed between opposite end parts in the peripheral direction of each of the plurality of sleeve elements and respective spring seats projecting radially outward from an inner periphery of the bearing retaining member, and a drive mechanism that makes each of the plurality of sleeve elements move in the radial direction is connected to an outer end in the radial direction of each guide pin.

3. The squeeze film damper bearing device according to claim 2, further comprising a vibration sensor that detects vibration of the rotating shaft, and a controller that controls operation of the drive mechanism according to vibration of the rotating shaft detected by the vibration sensor.

4. The squeeze film damper bearing device according to claim 1, further comprising a vibration sensor that detects vibration of the rotating shaft, and a controller that controls operation of a drive mechanism that makes each of the plurality of sleeve elements move in the radial direction according to vibration of the rotating shaft detected by the vibration sensor.

* * * * *